United States Patent [19]

Donner et al.

[11] Patent Number: 5,283,396

[45] Date of Patent: Feb. 1, 1994

[54] CALIBRATION OF A ROTATIONALLY SCANNING POSITION-TRACKING DEVICE

[75] Inventors: Marc D. Donner, New York; Ephraim Feig, Briarcliff Manor, both of N.Y.

[73] Assignee: International Business Machines Corporation, Armonk, N.Y.

[21] Appl. No.: 41,528

[22] Filed: Mar. 29, 1993

Related U.S. Application Data

[63] Continuation of Ser. No. 963,932, Oct. 19, 1992, abandoned, which is a continuation of Ser. No. 571,466, Aug. 22, 1990, abandoned.

[51] Int. Cl.[5] .................. G08C 21/00; G02B 5/08
[52] U.S. Cl. .................. 178/18; 250/252.1; 356/141; 364/560
[58] Field of Search .......... 178/19, 18; 356/375, 356/1, 191; 250/451.1, 252 H, 252 R; 340/706, 710; 364/560, 571

[56] References Cited

U.S. PATENT DOCUMENTS

| | | |
|---|---|---|
| 3,613,066 | 10/1971 | Cooreman . |
| 3,924,107 | 12/1975 | Sakai . |
| 4,294,543 | 10/1981 | Apple et al. . |
| 4,369,365 | 1/1983 | Bedford et al. . |
| 4,402,608 | 9/1983 | DiMatteo et al. . |
| 4,490,608 | 12/1984 | Yeadon et al. . |
| 4,558,313 | 12/1985 | Garwin et al. . |
| 4,642,422 | 2/1987 | Garwin et al. ............ 178/18 |
| 4,707,710 | 11/1987 | Shinada . |
| 5,004,870 | 4/1991 | Osborn . |

*Primary Examiner*—Curtis Kuntz
*Assistant Examiner*—Paul Loomis
*Attorney, Agent, or Firm*—J. David Ellett, Jr.; Daniel P. Morris

[57] ABSTRACT

This invention is a method for calibrating a two beam rotationally scanned light beam interruption coordinate data input device. In particular, four reference objects which can be sensed by the effectively rotating directional sensor are disposed at measured equal interval distances along an essentially straight line. The four reference objects are positioned relative to the effectively rotating directional sensor so that each of the objects can be essentially individually sensed in turn in the course of effective rotation of the sensor. The effective angular velocity and effective center of rotation of the sensor is then determined from the known distance between adjacent reference objects and the measured time intervals between detection of adjacent pairs of reference objects by the effectively rotating directional sensor. The effective angular velocity is first determined and then the effective center of rotation of the sensor is determined from the angular velocity, distance between reference objects, and measured time intervals.

7 Claims, 1 Drawing Sheet

CALIBRATION OF A ROTATIONALLY SCANNING POSITION-TRACKING DEVICE

This application is a continuation of application Ser. No. 07/963,932, filed Oct. 19, 1992, now abandoned, which is a continuation of application Ser. No. 07/571,466, filed Aug. 22, 1990, now abandoned.

FIELD OF THE INVENTION

The present invention generally concerns coordinate-data input devices, and more particularly concerns the calibration of coordinate-data input devices of the rotationally scanned directional sensor type.

BACKGROUND ART

Detecting the interruption of a scanning beam of light by an object can be used to provide information about the location of the object. Specifically, the orientation of the light beam at the time of an interruption event gives the orientation of the object measured from an origin defined by an effective source of the light beam. If two scanning light beams from effective sources whose positions are known are interrupted by an object, the position of the object can be determined by triangulation from the respective orientations of the two beams at the times of the respective interruption events, provided that the position of the object is not colinear with a straight line extending through the effective sources of the two beams.

A coordinate-data input device employing two rotational scanned light beams for determining digital data which encodes the coordinates of the position of an object in a work area swept by the scanned beams is disclosed in U.S. Pat. No. 4,642,422 to Garwin and Levine. In the coordinate-data input device of the patent, each of the two scanning light beams was produced by a rotating beam-scan mirror reflecting a fixed light. The axis of rotation of the two beam-scan mirror constituted an effective source position of the scanning light beam. The two rotating mirrors were positioned near adjacent corners of the generally rectangular work area. A straight line extending between the axes of rotation of the two beam-scan mirrors defined a measurement base line of the device. When an object such as a stylus or human finger was positioned in the work area, the scanning light beams from the rotating beam-scan mirrors intersected the object, which caused light-variation events which were detected by the device. The time of a light-variation event could be used to determine an apparent angle of rotation a beam-scan mirror which defined an intersection angle between the measurement base line and the light beam intersecting with the object. Such rotation angles from the two beam-scan mirrors together with the distance between the axes of rotation of the two beam-scan mirrors could be used in a trigonometric calculation to provide coordinate values for the location of the object in the work area.

A calibration procedure was used in the coordinate-data input device of the '422 patent to correct for certain systematic errors—referred to as angle "index errors"—corresponding to non zero angles between the light beam and the measurement base line at a scan-start time which a control system of the device took as the time the light beam coincided with the base line. The calibration procedure involved positioning three calibration-targets at known relative positions in the work area of the device. According to the '422 patent, the three calibration targets could be positioned in a colinear arrangement, but need not be. A method for detecting and correcting an angle index error associated with either scanning light beam was disclosed in the patent which involved using the event times at which each scanning light beam intersects the three calibration targets, the time interval for the beam to complete one full revolution, and the relative positions of the three calibration targets.

Although the calibration procedure of the '422 is effective to determine and correct angle index errors in rotationally scanned beam-interruption coordinate data-input devices which arise from many sources, the procedure assumes that the rotational velocity of each rotating beam-scan mirror is constant over a full revolution of the mirror, which may not always be the case in certain coordinate-data input devices. Variations in the rotational velocity of a beam-scan mirror which are periodic over each revolution can be one source of angle index errors in a rotationally scanned beam-interruptions coordinate-data input device. Such periodic variations in rotational velocity can also render the calibration procedure of the '422 patent not fully effective to determine and correct such errors.

SUMMARY OF THE INVENTION

We have invented a method and apparatus for determining with precision the effective position and effective angular velocity of an effectively rotating directional sensor which avoids problems in the prior art noted above. A preferred example of such an effectively rotating directional sensor may involve a rotating mirror in cooperation with fixed optical elements such as a laser, beam splitter and photodetector to form a rotationally-scanned light beam interruption coordinate-data input device for a computer or other digital data processor.

In the subject invention, four reference objects which can be sensed by the effectively rotating directional sensor are disposed at measured substantially equal-interval distances along an essentially straight line. The four reference objects are positioned relative to the effectively rotating directional sensor so that each of the objects can be essentially individually sensed in turn in the course of effective rotation of the sensor. A procedure is described below by which the effective angular velocity and the effective center of rotation of the sensor can be determined from the known distance between adjacent reference objects and the measured time intervals between detection of adjacent pairs of reference objects by the effectively rotating directional sensor. More specifically, the effective angular velocity is first determined as a solution of a mathematical equation. From the effective angular velocity thus determined together with the measured time intervals and the known distance between adjacent reference objects, the effective center of rotation of the sensor is determined.

The invention can be used to advantage to calibrate a two-beam rotationally-scanned light-beam interruption coordinate-data input device of the type disclosed generally in the U.S. Pat. No. 4,642,422 discussed above and incorporated in the present specification by reference.

Preferably, the four reference objects are cylindrical stubs projecting at essentially equal—distance intervals from a ruler—like calibration strip. The preferred calibration strip can be placed in the work area of a coordinate-data input device.

Preferred embodiments of the invention are essentially insensitive to any variations in the rotational velocity of the effective source of the rotationally scanned light beam in such devices over portion's of the rotational scan which are directed outside of the work area in which light-beam-variation events occur.

BRIEF DESCRIPTION OF THE DRAWINGS

Preferred embodiments of the invention are described below with reference to the following drawings.

PREFERRED EMBODIMENTS OF THE INVENTION

Figure 1:
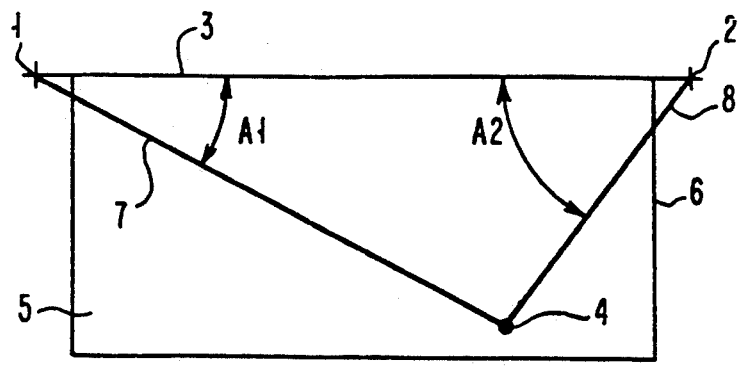
FIG. 1 is a schematic drawing of a work area of a two-beam rotationally scanned light-beam interruption coordinate-data input device which can be calibrated by a preferred embodiment of the present invention.

Turning first to FIG. 1, a rotationally-scanned light-beam-interruption coordinate-data input device includes a first rotatable beam-scan mirror 1 and a second rotatable beam scan mirror 2. A base line 3 extended between the axes of rotation of the two beam-scan mirrors 1, 2. Beams of light from corresponding first and second stationary light sources (not shown) impinge upon the first and second beam-scan mirrors 1 and 2 to produce first and second rotationally-scanned light beams 7 and 8. Rotation of each beam-scan mirror 1, 2 cause the corresponding rotationally-scanned light beam 7, 8 to sweep across a generally rectangular work area 5. The work area 5 is bounded by a perimeter 6. The coordinate-data input device includes a beam-intersection-event detector (not shown) located outside of the work-area perimeter 6 for detecting the times at which a rotationally-scanned light-beam 7, 8 intersects a stylus 4 or other object placed in the work area 5.

Figure 2:
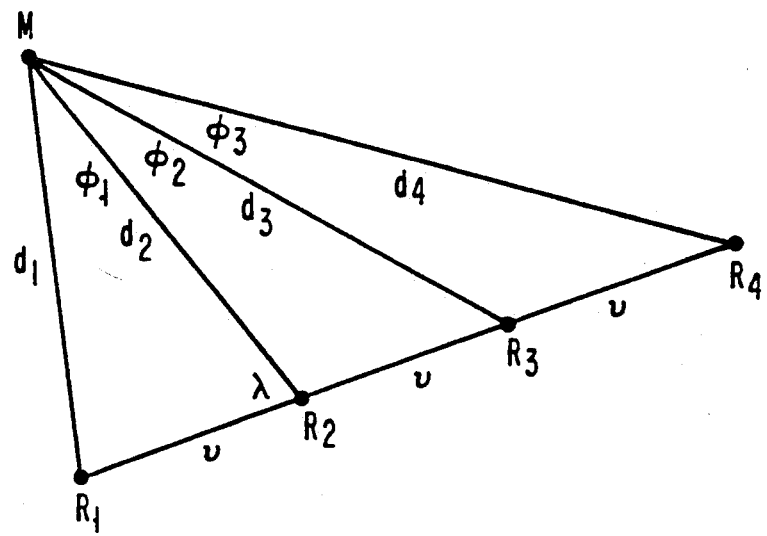
FIG. 2 illustrates four reference objects positioned on the work area of the coordinate-data input device of FIG. 1 and certain angles defined between the reference objects and the effective source of one of the two rotationally scanned light beams of the device.

Turning now to FIG. 2, reference objects 11, 12, 13, 14 are placed in the work area 5 at essentially equal-distance intervals along a substantially straight line. The rotation axis of the first beam-scan mirror 1 is located at a position indicated by M. The four reference objects are labeled $R_j$, $j=1, 2, 3, 4$. The distance between adjacent reference objects is denoted U in FIG. 2 and is known. The unknown distances from the beam-scan mirror 1 to the four reference objects 11-14 are denoted respectively $d_j$. Three angles $\phi_1$, $\phi_2$, $\phi_3$ are defined by three adjacent pairs of reference objects and the rotation axis of the mirror 1. The coordinate-data input device determines the three time intervals value $\mu_j$, $j=1, 2, 3$, which are the times it takes the sensor respectively to rotate the angles $\phi_j$ radians $j=1, 2, 3$. These angles and time values are related by the equations $\phi_j = \alpha \mu_j$, where $\alpha$ is an unknown rotational velocity and has dimensions [radians/time].

The following transcendental mathematical equation determines the rotational velocity $\alpha$:

$$0 = \sin \alpha(\mu_1+\mu_2) \sin \alpha(\mu_2+\mu_3) - 4 \sin \alpha\mu_1 \sin \alpha\mu_3.$$

Define $f(\alpha)$ by $$f(\alpha) = \sin \alpha(\mu_1+\mu_2) \sin \alpha(\mu_2+\mu_3) - 4 \sin \alpha\mu_1 \sin \alpha\mu_3.$$

a root of f in $\alpha$ can be solved numerically. A Newton-Raphson procedure is particularly preferred to determine a root of f. To carry out the Newton-Raphson procedure, the derivative of f with respect to $\alpha$, $f'(\alpha)$ is required. The derivative of f is computed to be $$f'(\alpha) = (\mu_1 + \mu_2) \cos \alpha(\mu_1 + \mu_2) \sin \alpha(\mu_2 + \mu_3) +$$
$$(\mu_2 + \mu_3) \sin \alpha(\mu_1 + \mu_2) \cos \alpha(\mu_2 + \mu_3) -$$
$$4\mu_1 \cos \alpha\mu_1 \sin \alpha\mu_3 - 4\mu_3 \sin \alpha\mu_1 \cos \alpha\mu_3.$$

The Newton-Raphson iterations are then computed using the equations $$\alpha_{m+1} = \alpha_m - \frac{f(\alpha_m)}{f'(\alpha_m)}.$$

The initial value $\alpha$ for the iterations is preferably estimated from the effective rotational period for the mirror. Once the root $\alpha$ is determined, the angles $\phi_j = \alpha\mu_j$, $j=1, 2, 3$ are determined. Taking the angles $\phi_1$ and $\phi_2$, thus found, the angle $\lambda$ is determined using the equation $$\cot(\lambda) = \tfrac{1}{2}(\cot(\phi_2) - \cot(\phi_1)).$$

The distance $d_1$ can then be determined from:

$$d_1 = U \frac{\sin(\lambda)}{\sin(\phi_1)}.$$

The coordinates of the position M are then readily determined in a coordinate frame defined relative to the reference objects.

An analagous determination can be made of the coordinates of the position of the rotation axis of the beam-scan mirror 2 in the same coordinate system. The calibration procedure can then be completed as described in the U.S. Pat. No. 4,642,422 incorporated by reference and angle index errors corrected for.

It is not intended to limit the present invention to the specific embodiments described above. It is recognized that changes may be made in the devices and processes specifically described herein without departing from the scope and teaching of the instant invention, and it is intended to encompass all other embodiments, alternatives and modifications consistent with the invention.

We claim:

1. A calibration method for determining the effective position and effective angular velocity of an effectively rotating directional sensor comprising:
    (a) placing four reference objects which can be sensed by the effectively rotating directional sensor at measured substantially equal-interval distances along an essentially straight line, the four reference objects being positioned relative to the effectively rotating directional sensor so that each of the objects can be essentially individually sensed in turn in the course of effective rotation of the sensor;
    (b) sensing each of the four reference objects in turn with the directional sensor during effective rotation of the sensor to determine three time intervals denoted $\mu_1$, $\mu_2$, $\mu_3$, one time interval being the time between the sensing of a corresponding one of the three adjacent pairs of reference objects;

(c) determining an effective rotational velocity $\alpha$ defined by a value of $\alpha$ for which the expression $$\sin \alpha(\mu_1+\mu_2) \sin \alpha(\mu_2+\mu_3) - 4 \sin \alpha\mu_1 \sin \alpha\mu_3$$

is essentially equal to zero; and (d) trigonometrically determining the effective center of rotation of the sensor from the effective angular velocity, the measured time intervals, and the distance between adjacent reference objects.

2. A calibration method for a beam scanned coordinate-data input device having a rotating mirror for scanning, comprising:

placing at least four reference objects along an essentially straight line which can be sensed by said beam scanned coordinate-data input device, a distance between any two adjacent reference objects being predetermined;

sensing each of said four reference objects with said scanned coordinate-data input device;

determining three time intervals, $\mu_1$, $\mu_2$, and $\mu_3$, each of said time intervals corresponding to the time between said sensing of adjacent reference objects;

determining an effective rotational velocity $\alpha$ of said rotating mirror in said scanned coordinate-data input device from said three time intervals;

trigonometrically determining the effective positional coordinates of a center of rotation for said rotating mirror with respect to said reference objects from $\alpha$, said three time intervals, and said distances between said four reference objects.

3. A calibration method for a beam scanned coordinate-data input device having a rotating mirror for scanning, as in claim 2, wherein:

said distance between a first pair of adjacent reference objects is approximately equal to a distance between a second pair of adjacent reference objects.

4. A calibration method for a beam scanned coordinate-data input device having a rotating mirror for scanning, as in claim 2, wherein:

$\mu_1$, $\mu_2$, $\mu_3$, and $\alpha$ are related such that; $(\sin \alpha(\mu_1+\mu_2))(\sin \alpha(\mu_2+\mu_3))$ is essentially equal to $4(\sin(\alpha\mu_1) \sin(\alpha\mu_3))$.

5. A calibration method for a beam scanned coordinate-data input device having a rotating mirror for scanning, as in claim 2, further comprising:

determining the magnitude of the index angular difference between the position of the mechanical sweep movement when the electrical signal indicating the beginning of a mechanical scanning sweep movement occurs and a base line through the scanning axis, and correcting by at least one of addition or subtraction said index angular difference from the indicated angle at each scanning light interruption event.

6. A calibration method for a beam scanned coordinate-data input device having a rotating mirror for scanning, as in claim 5, wherein:

said distance between a first pair of adjacent reference objects is approximately equal to a distance between a second pair of adjacent reference objects.

7. A calibration method for a beam scanned coordinate-data input device having a rotating mirror for scanning, as in claim 6, wherein:

$\mu_1$, $\mu_2$, $\mu_3$, and $\alpha$ are related such that, $(\sin \alpha(\mu_1+\mu_2))(\sin \alpha(\mu_2+\mu_3))$ is essentially equal to $4(\sin(\alpha\mu_1) \sin(\alpha\mu_3))$.

* * * * *